(12) United States Patent
Bing et al.

(10) Patent No.: US 11,453,195 B2
(45) Date of Patent: Sep. 27, 2022

(54) DECONSTRUCTED FLOOR MAT

(71) Applicant: Cintas Corporate Services, Inc., Cincinnati, OH (US)

(72) Inventors: Richard R. Bing, West Chester, OH (US); Patrick J. Chilenski, Cleves, OH (US); David S. Mesko, Wyoming, OH (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 363 days.

(21) Appl. No.: 16/516,745

(22) Filed: Jul. 19, 2019

(65) Prior Publication Data
US 2020/0024799 A1    Jan. 23, 2020

Related U.S. Application Data

(60) Provisional application No. 62/701,878, filed on Jul. 23, 2018.

(51) Int. Cl.
*D06N 7/00* (2006.01)
*A47L 23/26* (2006.01)
(Continued)

(52) U.S. Cl.
CPC ............ *B32B 3/30* (2013.01); *A47G 27/0206* (2013.01); *A47L 23/266* (2013.01); *B32B 3/06* (2013.01);
(Continued)

(58) Field of Classification Search
CPC .............. A47L 23/266; A47G 27/0206; A47G 27/0418; A47G 27/0243; B32B 3/06;
(Continued)

(56) References Cited

U.S. PATENT DOCUMENTS 4,361,925 A * 12/1982 Yamamoto ............ A47L 23/266
15/217
5,270,089 A     12/1993 Alston et al.
(Continued)

FOREIGN PATENT DOCUMENTS

WO      WO-0016682 A1 *  3/2000 ........... A47L 23/266
WO      2003106747 A2    12/2003
(Continued)

OTHER PUBLICATIONS

International Searching Authority; International Search Report and Written Opinion; PCT/US2019/42751; dated Oct. 3, 2019; 20 pgs.
(Continued)

*Primary Examiner* — Cheryl Juska
(74) *Attorney, Agent, or Firm* — Wood Herron & Evans LLP

(57) ABSTRACT

A multi-component floor mat has a base or frame layer, intended to be positioned on the floor, that is dimensioned to accommodate a flexible textile mat or rug top layer portion that is releasably held in place on or in the base or frame layer by an attachment coupling feature associated with one or both portions, thereby allowing for the easy removal or replacement of the textile top layer of the mat and its economical laundering.

13 Claims, 19 Drawing Sheets

(51) Int. Cl.
*A47G 27/02* (2006.01)
*B32B 3/30* (2006.01)
*B32B 3/06* (2006.01)
*A47G 27/04* (2006.01)

(52) U.S. Cl.
CPC ....... *D06N 7/0089* (2013.01); *A47G 27/0243* (2013.01); *A47G 27/0418* (2013.01); *B32B 2307/208* (2013.01); *B32B 2471/04* (2013.01); *D06N 2209/045* (2013.01); *D06N 2213/068* (2013.01)

(58) Field of Classification Search
CPC . B32B 3/30; B32B 2307/208; B32B 2471/04; D06N 7/0089; D06N 2209/045; D06N 2213/068
See application file for complete search history.

(56) References Cited

U.S. PATENT DOCUMENTS

| | | | |
|---|---|---|---|
| 5,524,317 A * | 6/1996 | Nagahama | A47L 23/266 15/217 |
| 5,706,623 A | 1/1998 | Brown | |
| RE36,677 E | 5/2000 | Reuben | |
| 2003/0180499 A1 * | 9/2003 | Kobayashi | A47L 23/266 428/95 |
| 2004/0013849 A1 * | 1/2004 | Kobayashi | A47L 23/266 428/95 |
| 2014/0283468 A1 | 9/2014 | Weitzer | |
| 2016/0037949 A1 * | 2/2016 | Dawson | A47G 27/0418 428/95 |
| 2016/0257097 A1 | 9/2016 | Bing et al. | |
| 2017/0037567 A1 * | 2/2017 | Love | D06N 7/0068 |
| 2017/0282498 A1 * | 10/2017 | Love | D06F 35/006 |
| 2020/0008600 A1 * | 1/2020 | Bing | A47G 27/0293 |
| 2020/0121161 A1 * | 4/2020 | Bing | A47L 23/266 |

FOREIGN PATENT DOCUMENTS

| | | |
|---|---|---|
| WO | 2016022643 A1 | 2/2016 |
| WO | 2017023593 A1 | 2/2017 |
| WO | 2017087227 A1 | 5/2017 |
| WO | 2017172366 A1 | 10/2017 |

OTHER PUBLICATIONS

European Patent Office, Extending Search Report issued in EP 19841377.5-1005, dated Mar. 22, 2022 (9 pages).
European Patent Office, Extending Search Report issued in EP 19831537.6-1005, dated Mar. 25, 2022 (7 pages).

* cited by examiner

DECONSTRUCTED FLOOR MAT

This claims the benefit of U.S. Provisional Patent Application Ser. No. 62/701,878, filed Jul. 23, 2018 and hereby incorporated by reference in its entirety.

BACKGROUND OF THE INVENTION

This invention relates to a floor mat. More specifically, the invention relates to a multi-component floor mat that includes a base or frame portion dimensioned to accommodate a flexible textile mat or rug portion releasably held in place on or in the base or frame portion by one of a variety of coupling features.

Mats which are typically used in or near entrances in retail and industrial buildings, offices, and residences, may be unitary mats with a rubber base layer. Such mats are commonly used in industrial laundry businesses that rent the mats to customers for a period of time and then recover, wash, regenerate and re-rent the mat, to the same or to a different customer.

Commercial floor mats are typically constructed by fusing a layer of tufted carpet to an impervious rubber base layer. This construction and material selection is durable over time and withstands the wear and tear experienced during use and laundering cycles.

The impervious rubber base, while it protects the floor, is a detriment to the effectiveness of the washing and, more particularly, the drying cycles. Commercial laundering facilities typically put such floor mats through very aggressive washing cycles, intense spinning and extraction cycles, and very hot drying cycles. Drying cycles commonly use temperatures that reach the glass temperature of the materials of the tufted carpet floor mat.

Such aggressive laundering processes have the effect of accelerating the aging of the mat. The temperature and chemicals remove plasticizers from the rubber, making it stiff and brittle. Also, the carpet fabric is crushed or frayed and loses its sheen.

Another negative effect of having an impervious rubber base layer on the mat is its weight. The weight of the mat has an immediate effect on the safety and health of the service professionals that remove, deliver and install them by carrying them on their shoulders, fuel inefficiencies for the delivery trucks on the service routes by moving hundreds or thousands of pounds every day.

In the case of such unitary mats, the base or floor portion and the textile mat portion are constructed as a unitary, inseparable structure. When such mats are used in the industrial laundry business, both portions of the mat—including the base portion (typically made of a relatively thick layer of rubber or similar material)—must be recovered, transported to and from the customer location, washed and regenerated, even though it is likely that only the textile portion requires laundering. Having to include the relatively heavy base or floor portion of the mat in these various operations causes significant and needless inefficiencies due to the additional weight and bulk contributed by the base or floor portion, including the considerable energy costs associated with transporting and washing such mats.

To reduce these inefficiencies, and to provide additional flexibility and variety in the choice of the textile portion of the mat, separable mats have been developed. These mats typically have a base portion and a separate, removable textile portion that fits in or on the base portion. The heavier, bulkier base portion can then remain in place, while the lighter, less bulky textile portion can be removed or exchanged for laundering or, for example, for the purpose of changing the appearance of the mat as an interior design element in a customer's setting. Because only the relatively lightweight, compact textile portion need be serviced, industrial launderers can achieve significant economies during the collecting, laundering, and re-distributing processes that such laundries routinely undertake during the lifetime of the textile portion of the mat. Substantial cost savings can be realized if the relatively heavy and bulky base portion can be left in place.

The concept on which such separable mats is based is that the base portion, being made of rubber or the like, can remain in place on a semi-permanent basis once it is placed at the desired location. Thereafter, the textile portion of the mat can be replaced or exchanged as housekeeping or interior design needs arise. Accordingly, in addition to a reduction in the inefficiencies referred to above, an interchangeable system of mats can be produced to meet a variety of user needs and specifications, making it possible to offer a wide variety of mats at relatively modest cost, and allowing for easy replacement or substitution of the textile portion of the mat.

The separable mat, however, requires some mechanism to provide secure and reliable attachment between the base portion and the textile portion. If such a mechanism is ineffective, the textile portion of the separable mat can exhibit turned-up edges, ripples, and/or mis-alignment with the base portion, all of which can result in conditions that are both unsightly and unsafe. Additionally, such mats provide impaired ability to remove soil, moisture, or debris from shoes, thereby adversely affecting the essential functionality of the mat.

To provide adequate and dependable attachment between the base portion and the textile portion of such mats, and thereby eliminate unsightliness as well as a principal cause of tripping, several methods for detachably securing the base portion to the textile portion have been developed. However, none of the known attachment schemes have fully addressed these problems.

An adequate attachment scheme should offer an attachment force favorably and stably against changes in an external environment and vary little even after repeated laundering.

It is one purpose of this invention to provide a mat that can be "deconstructed" in the field from a mat unit into a rubber base layer that stays at location, and a top fabric layer that will be processed, laundered, repaired or replaced.

One more purpose is to provide an interface that allows the assembly of the top and base layers in the field, and that results in a stable, mostly monolithic mat unit.

Another purpose is to provide a highly breathable, dimensionally stable, launderable top fabric layer that can absorb and manage moisture and collect and extract soil.

An added purpose is to provide a very light fabric layer that can be laundered and processed with less aggressive processes and cycles, and that allows an increase in efficiency for the processing facilities.

SUMMARY OF THE INVENTION

These and other objectives have been addressed by a deconstructed mat according to this invention.

A deconstructed mat according to various embodiments of this invention is a floor mat having a base layer, a top layer, and an interface attachment mechanism or coupling feature connecting both layers together as a mat unit. The base layer may be constructed of rubber or similar material(s) and provides all the features necessary to receive the top layer. The base layer forms an impervious layer to protect the floor and has features that receive and contain the top layer, and the soil and water captured by the top layer. The base layer may also function as a buffer tank that will hold the moisture until it is evaporated or extracted by the top layer. In one embodiment, the top layer has a cavity with a minimum depth driven in part by the thickness of the top layer.

More embodiments will be described in the following pages. The top layer may be a removable, highly breathable, lightweight, durable, dimensionally stable, launderable fabric layer that interfaces with the base layer. It has matching geometry with the cavity of the base layer, where it fits inside the base layer in various embodiments. The interface helps to easily align the top layer on the base layer for quick installation, and also provides locking features to keep the two layers assembled, but separable as needed.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
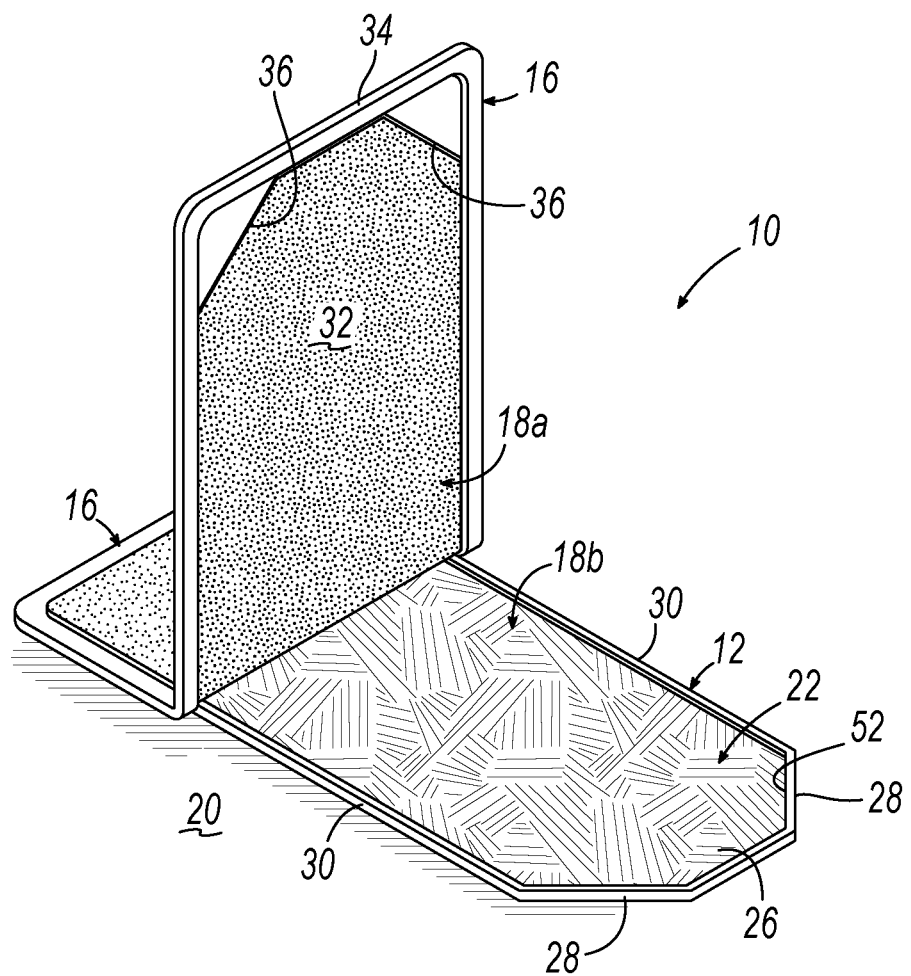
FIG. 1 is a perspective view of one embodiment of a deconstructed mat including a top layer partially peeled away from a bottom layer according to this invention.

Referring to the drawings, various embodiments of a deconstructed floor mat 10 according to this invention are show. One purpose of various aspects of this invention is to provide a floor mat 10 that can be deconstructed in the field from the assembled mat unit 10 to a base layer 12 that stays on-site or at location 14 and a top layer 16 that will be processed, cleaned, repaired and/or replaced, as needed. An additional purpose is to provide an interface, an attachment mechanism or a coupling feature 18 that allows the selective assembly of the top and base layers 16, 12 in the field 14 and that results in a stable monolithic floor mat unit 10.

Another purpose is to provide a highly breathable, dimensionally stable, launderable top fabric layer 16 that can absorb and manage moisture and collect and extract soil. An additional purpose is to provide a very light fabric layer 16 that can be laundered and processed with less aggressive processing and cycles and that allows an increase in efficiency for the processing facilities.

In various embodiments, a deconstructed floor mat 10 according to various embodiments of this invention is a floor mat 10 having a base layer 12, a top layer 16 and an interface 18 releasably connecting the base and top layers 12, 16. The interface 18 may have a top layer coupling feature complementary to a base layer coupling feature. The base layer 12 may be constructed of rubber or similar material and is provided with all the features necessary to receive the interface 18. The base layer 12 may form an impervious layer to protect the floor 20 and may have features that receive and contain the top layer 16 and any soil and/or water captured by the top layer 16. In this manner, the base layer 12 also functions as a buffer tank that will hold the moisture until it is evaporated or extracted by the top layer 16.

In one embodiment, the interface 18 that holds the top layer 16 in the base layer 12 may be in the form of a cavity 22 with a minimum depth determined by the thickness of the top layer 16. In other embodiments, the interface 18 may be in the form of large engaging surfaces and bodies. Additional embodiments will be described in conjunction with the attached drawings.

In various embodiments, the top layer 16 may be removable and highly breathable, lightweight, durable, dimensionally stable and launderable fabric layer that releasably mates with the base layer 12. The top layer 16 may have matching geometry with a cavity 22 of the base layer 12 such that it may fit inside the cavity 22 of the base layer 12 when assembled into a floor mat 10. The interface 18 may comprise large features that help to easily align the top layer 16 on the base layer 12 for quick and easy installation and also provide locking features to keep the two layers 12, 16 assembled as a floor mat 10.

Referring to FIG. 1, one embodiment of a deconstructed floor mat 10 according to this invention is shown. The floor mat 10 includes a base layer 12 which has a lower surface for gripping an underlying floor surface 20 and may be impervious to the flow of water, dirt, soil or other contaminants. The base layer 12 may include the cavity 22 bounded by a peripheral lip 52. The mat 10 also includes an upper or top layer 16 which typically has a fabric component and is aesthetically pleasing and functions to encapsulate contaminants such as water, slush, dirt and other particles. Generally, the top layer 16 is a non-slip surface and is highly breathable so that any contaminants and moisture captured in the top layer 16 or contained in the base layer 12 may evaporate. The floor mat 10 may have a plurality of top layers 16 each of which is selectively, sequentially and serially coupled to the base layer 12. The top layer 16 is retained on the base layer by an interface or coupling feature 18 according to one of the variety of embodiments of this invention which allows the top layer 16 to be gripped and held by the base layer 12 during use and after assembly. The interface or coupling feature 18 may include complimentary features 18a, 18b on the top layer 16 and base layer 12, respectively.

Referring to FIG. 1, one embodiment of a deconstructed mat 10 according to this invention is shown, including a top layer 16 overlaying a bottom or base layer 12 and an interface 18 to assemble the top and base layers 16, 12 together. In this embodiment, the base layer 12 has a generally rectangular shape on a first end of the mat 10 with generally orthogonal or right-angle corners. The opposite end of the base layer 12 has an end section 26 and a pair of chamfered corners 28 joining the end to sides 30 of the base layer 12.

The top layer 16 includes a generally fabric body 32 surrounded by a frame 34. The frame 34 is slightly larger than the dimensions of the base layer 12 to overhang and cover the base layer 12 when the top layer 16 is mated with the base layer 12. One aspect of the interface 18 of this embodiment of the deconstructed mat 10 includes enlarged angled corners 36 which mate with the chamfered corners 28 of the base layer 12 to thereby mate the base layer 12 with the top layer 16 to form the assembled mat unit 10.

Figure 2:
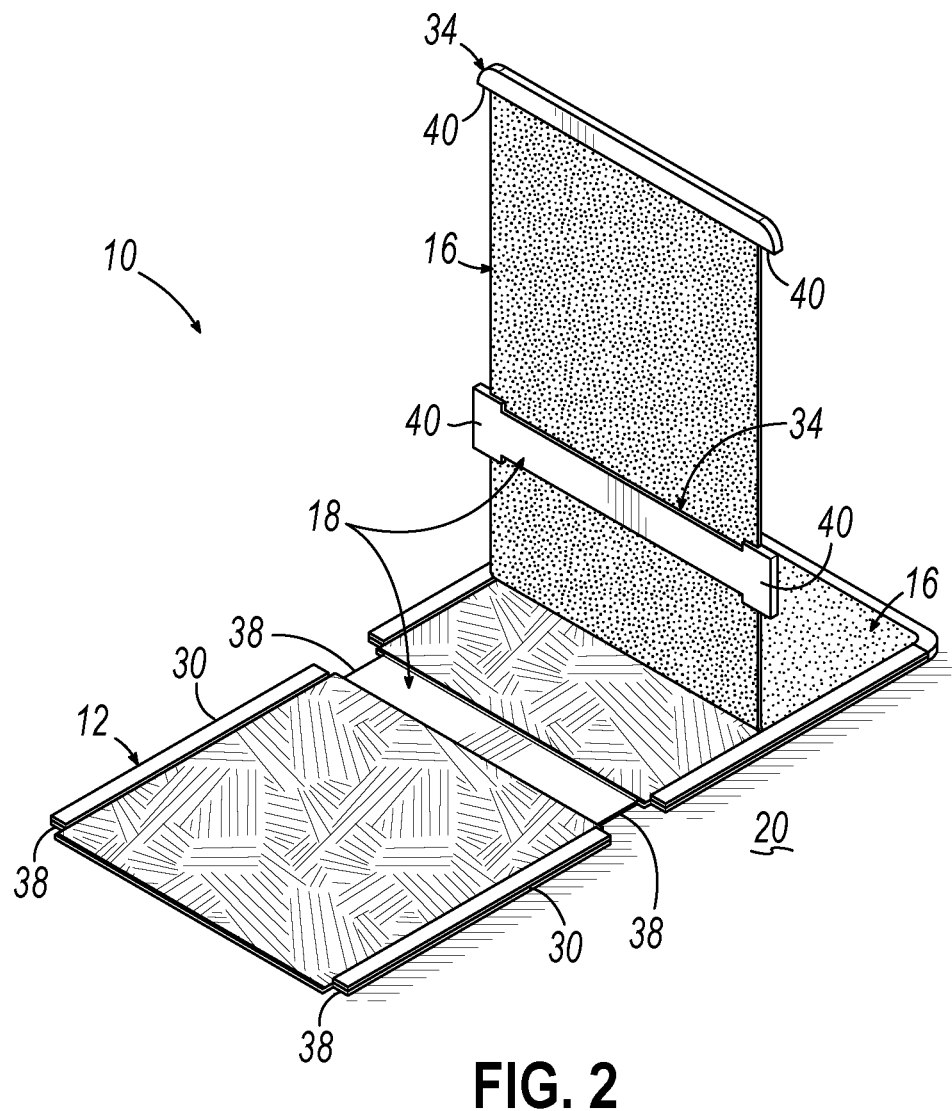
FIGS. 2-6 are similar views of additional embodiments of a deconstructed mat according to this invention.
Figure 3:
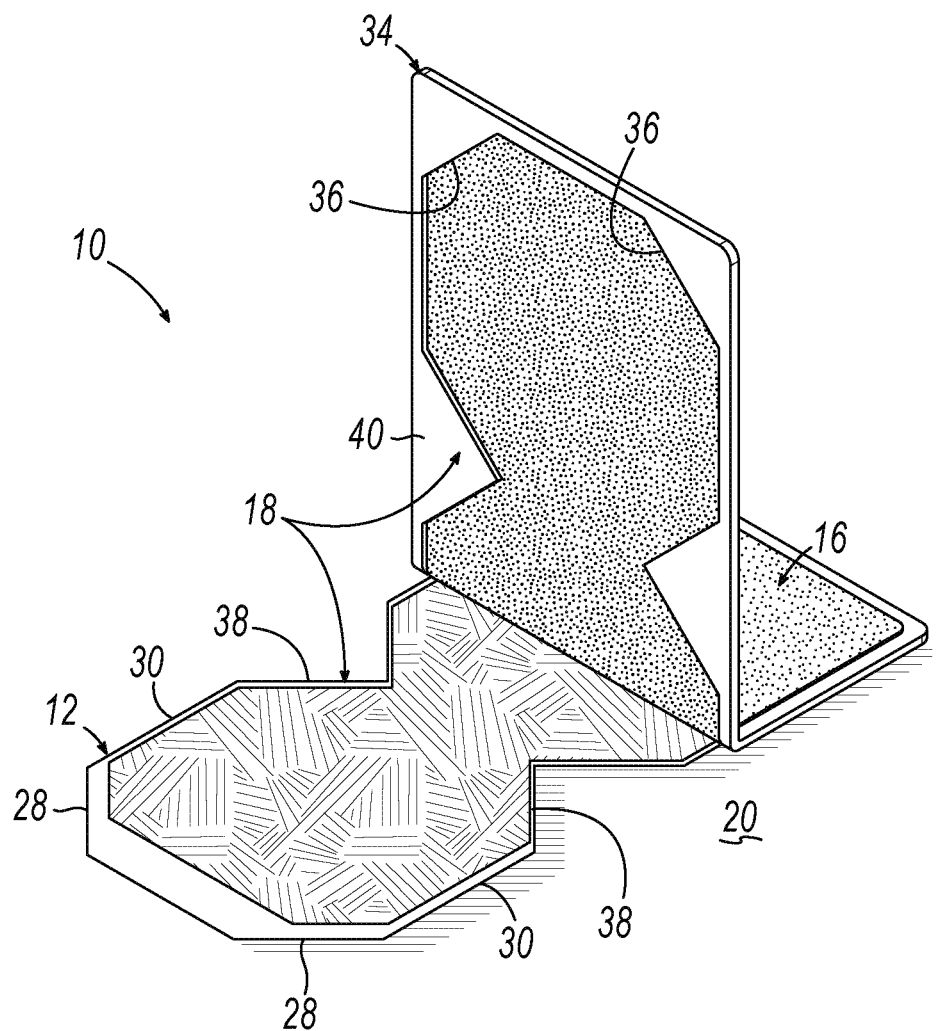

Further alternative embodiments of a deconstructed mat according to this invention are shown in FIGS. 2-3 in which the base layer 12 may include notches 38 in the side edges 30 and the top layer 16 includes a mating frame 34 with shaped features 40 which seat within the notches 38 of the base layer 12 as shown particularly in FIGS. 2 and 3. Interlocking notches 38 and features 40 between the base layer 12 and top layer 16 provide the mat 10 a visible indication of how to assemble the mat unit. The engagement of the features 40 with the notches 38 is visible from the top which provide confidence and intuitively signals to an installer 42 proper assembly of the mat 10.

Figure 4:
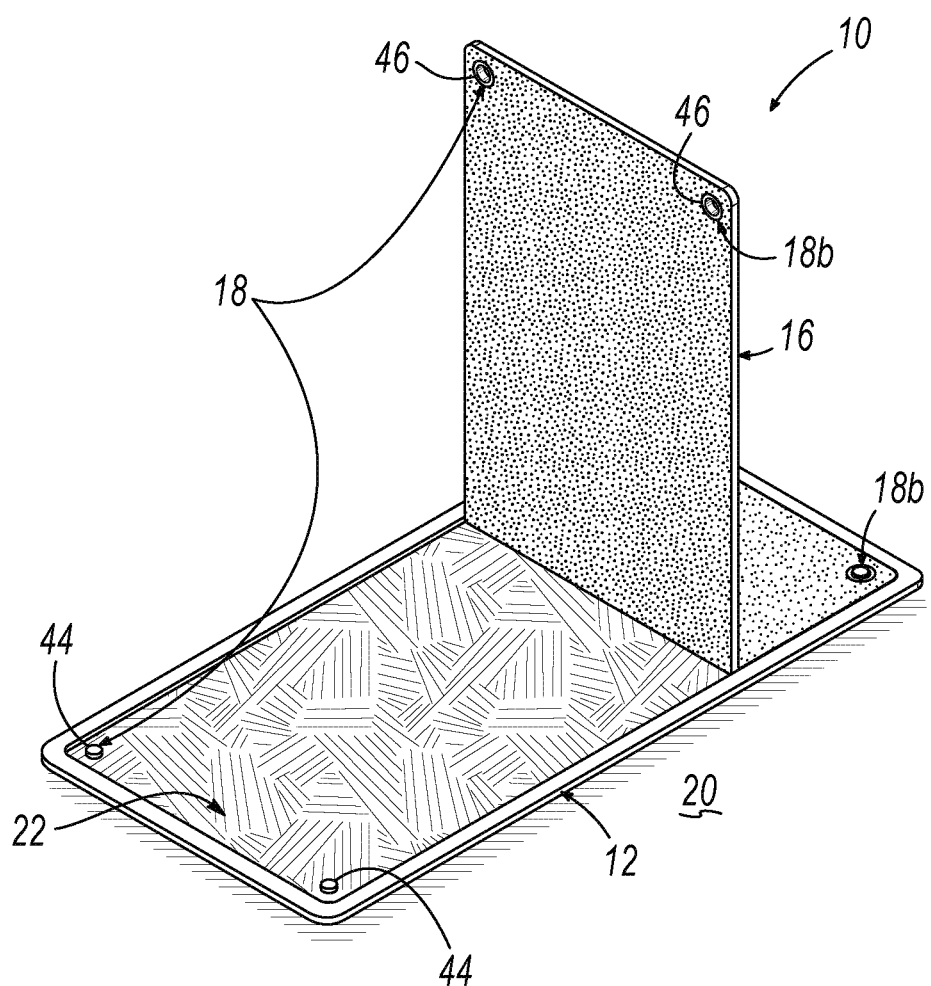
Figure 6:
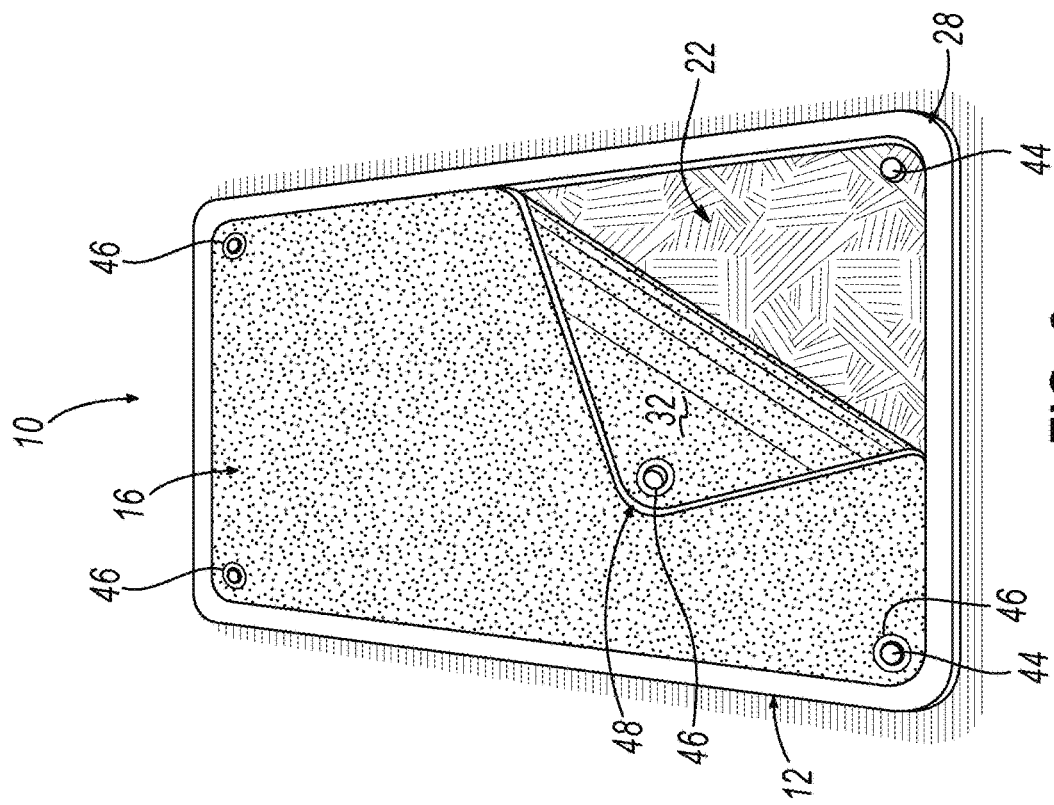
Figure 5:
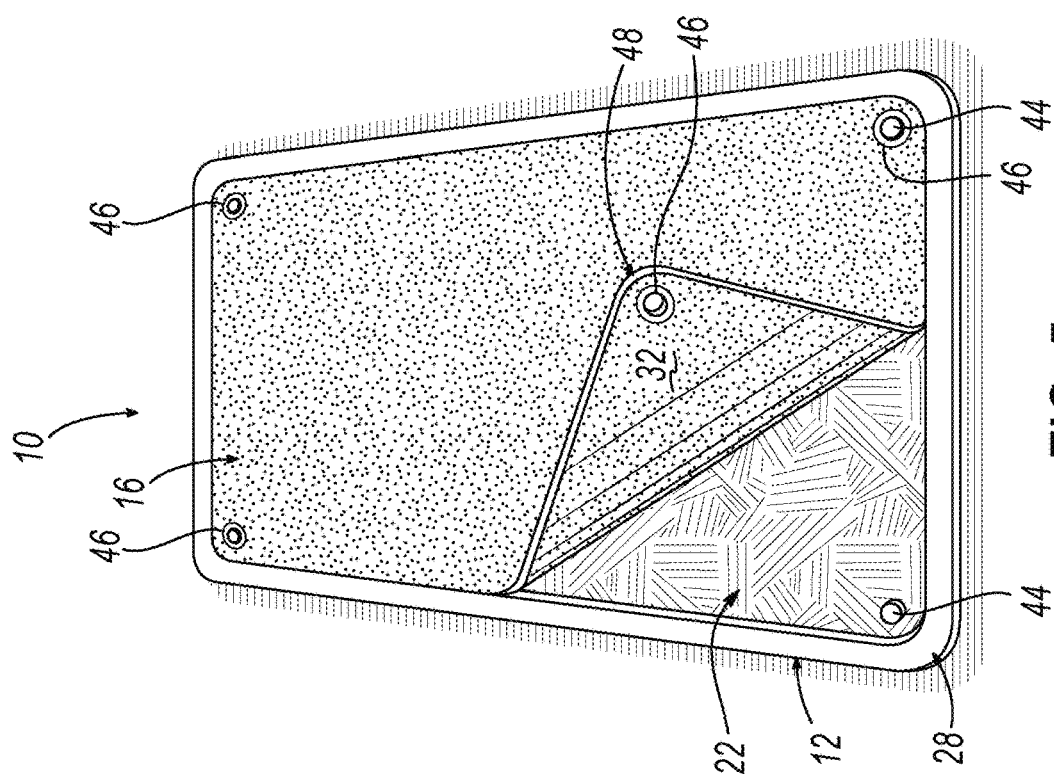
Figure 8:
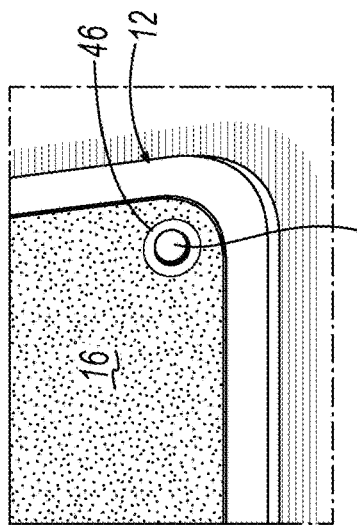
FIGS. 7 and 8 are perspective top views of the embodiment of FIGS. 4-6 with the top layer being secured to the base layer.
Figure 7:
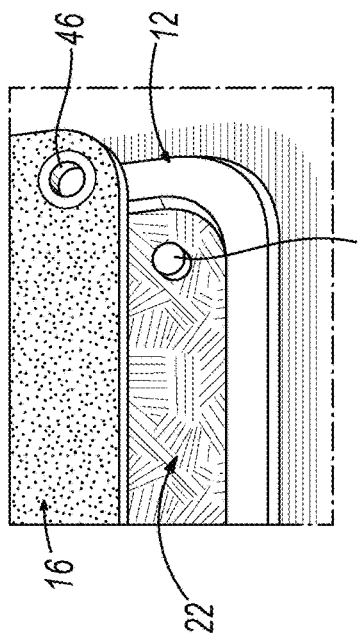

FIG. 4 includes a further alternative embodiment of a deconstructed mat 10 according to this invention with the interface 18 being a snap type of engagement. In each corner of the base layer 12, an upstanding stud 44 is provided which is seated within a socket 46 or openings in the top layer 16 to thereby stretch and assemble the top layer 16 to the base layer 12. FIGS. 5 and 6 provide further views of the embodiment shown in FIG. 4 in which the top layer 16 is highly breathable and absorbent yet lightweight to provide for the extraction of water from superior performance due to a microfiber blend of the fabric body 32 in one embodiment. The mats 10 shown in FIGS. 5 and 6 have one corner 48 of the top layer 16 peeled away exposing the cavity or tray 22 formed in the base layer 12 into which the top layer 16 is positioned. Upstanding studs 44 in each corner 28 of the base layer 12 engage with sockets 46 in the top layer 16 to thereby stretch and insert the top layer 16 into the cavity 22 of the base layer 12 as shown in FIGS. 7-8.

Figure 11:
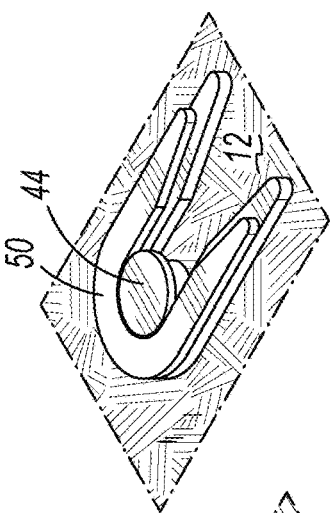
FIGS. 10 and 11 are perspective sequential views of the coupling feature of FIG. 9 securing the top layer to the base layer according to one embodiment of this invention.
Figure 10:
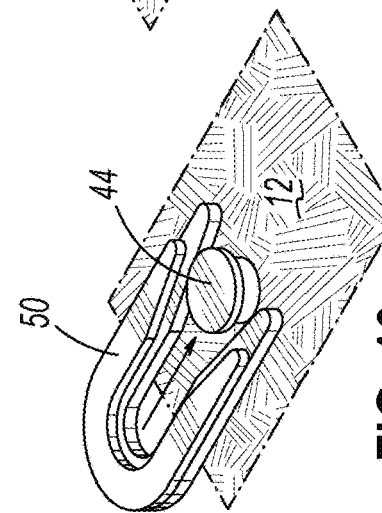
Figure 9:
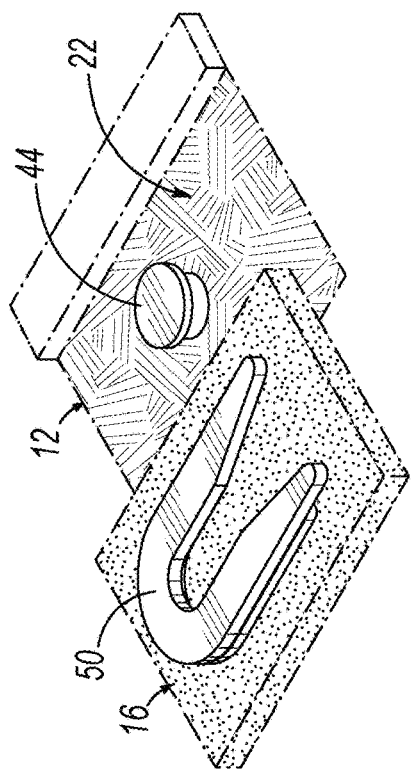
FIG. 9 is a perspective view of one coupling feature of this invention with the top layer shown inverted for clarity.

Further detail of various embodiments of the deconstructed mat 10 according to this invention is shown in FIGS. 9-11. In FIGS. 9-11 the interface components at one longitudinal end of the mat 10 are shown with the stud or post 44 protruding upwardly from the base layer 12. Affixed to the underside of the top layer 16 is a U-shaped interface component 50 adapted for easily mating with the stud 44 on the base layer 12 to provide for convenient and efficient assembly by the mat installer 42. The combination of the stud 44 on the base layer 12 and the U-shaped interface component 50 on the top layer 16 allows for blind assembly at a first end of the mat 10 such that the installer 42 may unfurl the top layer 16 and pull it to engage the studs 44 on one end of the base layer 12 with the U-shaped interface components 50 on the fabric layer 16 and then snap the studs 44 on the opposite longitudinal end of the base layer into the grommets or sockets 46 in the corresponding end of the top layer 16 as shown in FIGS. 7 and 8.

Figure 12:
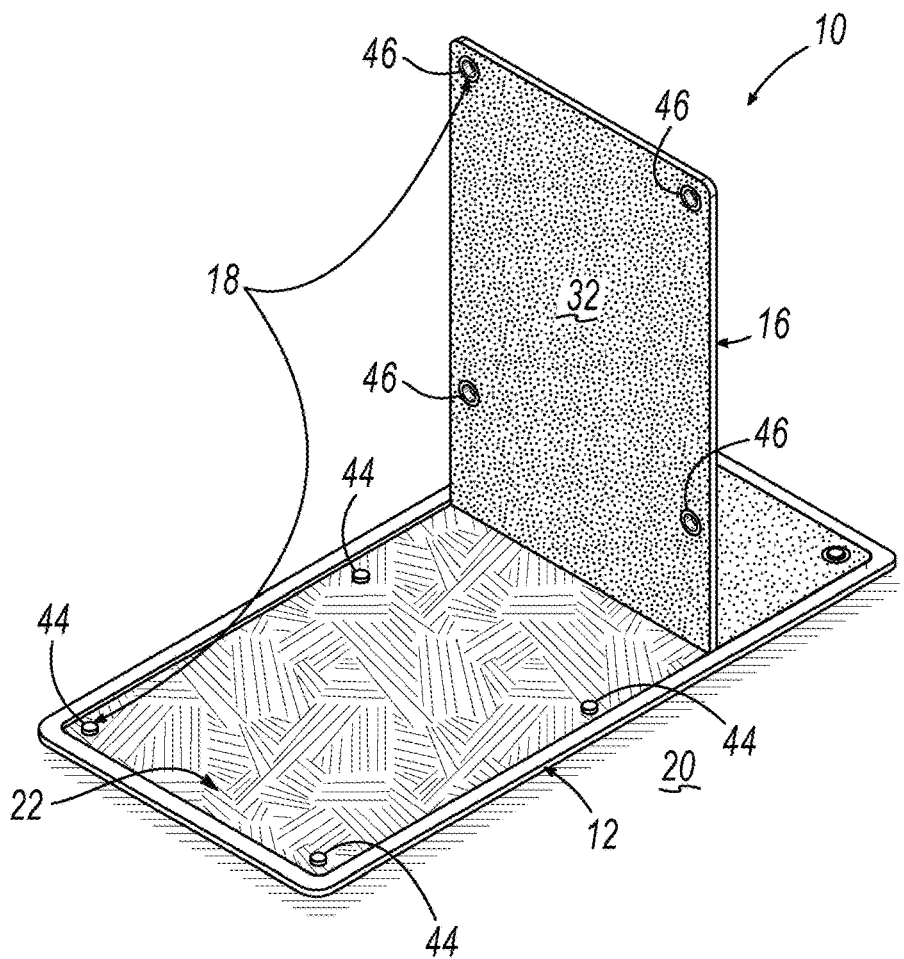
FIG. 12 is a perspective view of another embodiment of a deconstructed mat according to this invention with the top layer partially peeled away from the base layer.

A further embodiment of the mat 10 according to this invention is shown in FIG. 12 in which the studs 44 and sockets 46 are provided on the longitudinal ends of the mat and also midway between the ends in the central portion of the sides of the mat 10.

Figure 13:
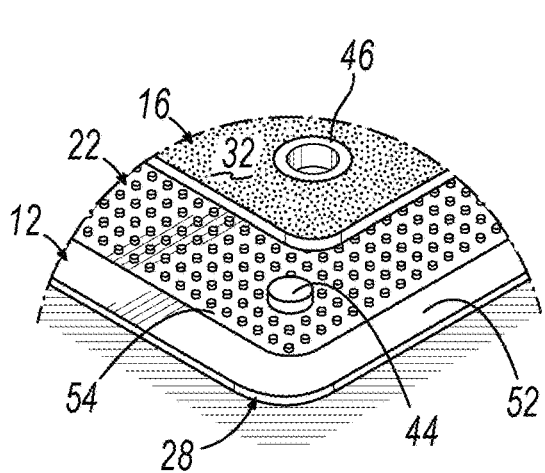
FIGS. 13 and 14 are views of the top layer and base layer of the embodiment of a deconstructed mat as shown in FIG. 12.

In FIG. 13, an enlarged view of the base layer 12 including a corner 28 of the base layer 12 and the cavity 22 formed on the interior of the base layer 12 by a perimeter lip 52. The base layer 12 may also include a textured gripper surface 54 to help adhere the fabric body 32 to the base layer 12 and minimize movement between the two components. The grommets or sockets 46 in the top fabric layer 16 fit over the studs 44 in the base layer 12 to keep the top layer 16 in place and prevent it from curling and buckling by creating tension on the top layer 16.

Figure 14:
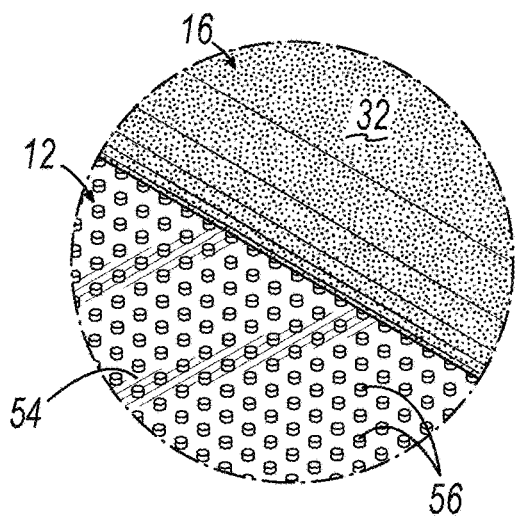

In FIG. 14, an enlarged view of one embodiment of the mat 10 shows detail of a gripper surface 54 of the base layer 12 to help reduce buckling and curling of the fabric body 32. Small projections 56 extend outwardly from the surface 54 of the base layer 12 to engage the undersurface of the fabric body 32 and thereby enhance adhesion between the two components.

Figure 15:
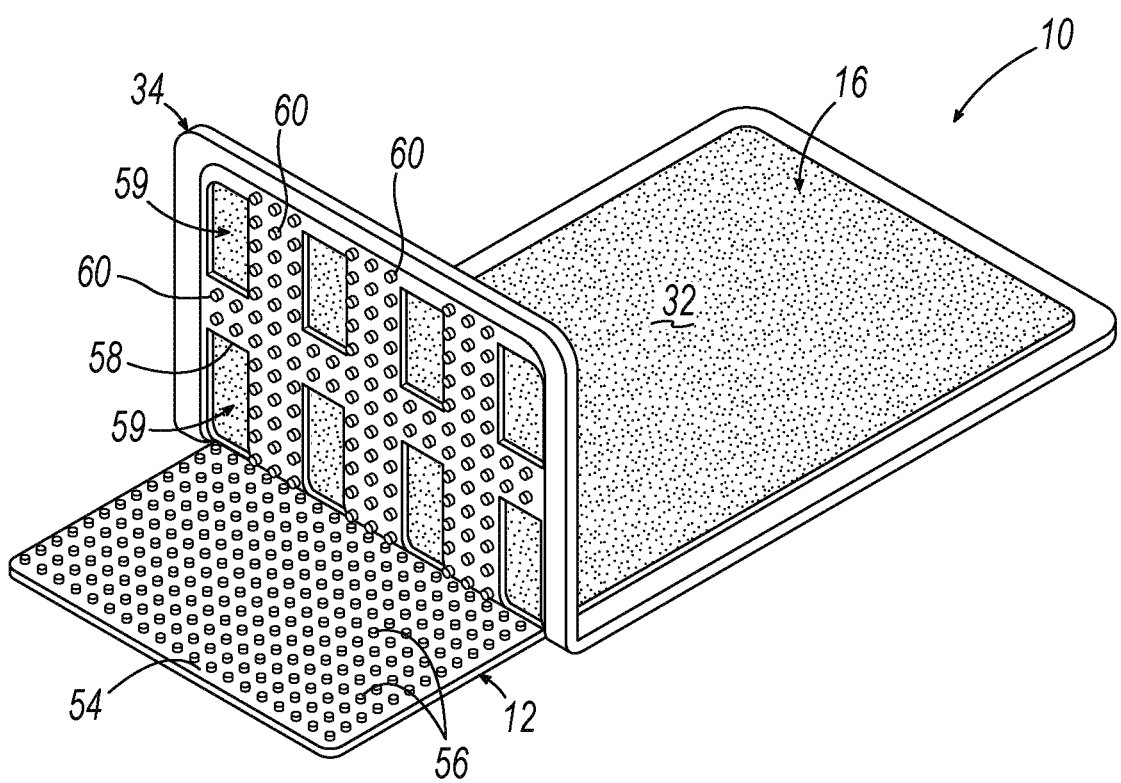
FIG. 15 is a perspective view of a further embodiment of a deconstructed mat according to this invention with the top layer partially peeled from the base layer.

Another embodiment of the mat 10 according to one aspect of this invention is shown in FIG. 15 in which a grid 58 with spaced apertures 59 is provided in addition to the frame 34 on the top layer 16. The grid 58 provides structural stability while allowing for breathability and weight reduction for the top layer 16. Fingers 60 project downwardly from the grid 58. Similarly, the base layer 12 includes a surface of upwardly projected evenly spaced rubber projection or fingers 56. The size of the rubber fingers 56 can be optimized for minimum height and width while providing a reliable support surface for the top fabric layer 16.

Figure 16:
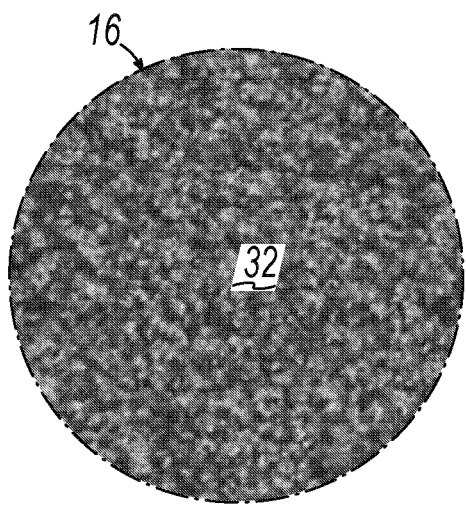
FIGS. 16 and 17 are enlarged views of the top layer and base layer, respectively, of the embodiment of FIG. 15.
Figure 17:
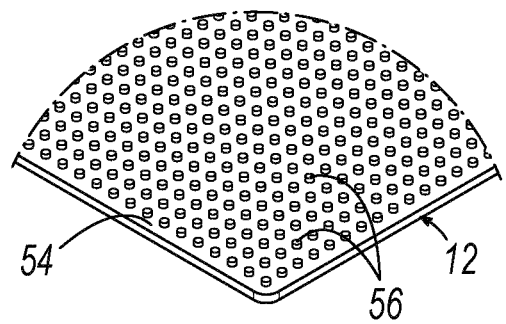

FIGS. 16 and 17 show enlarged views of the fabric body 32 of the top layer 16 of the embodiment in FIG. 15 and the upwardly projecting rubber fingers 56 on the upper surface 54 of the base layer 12 in FIG. 17.

Figure 18:
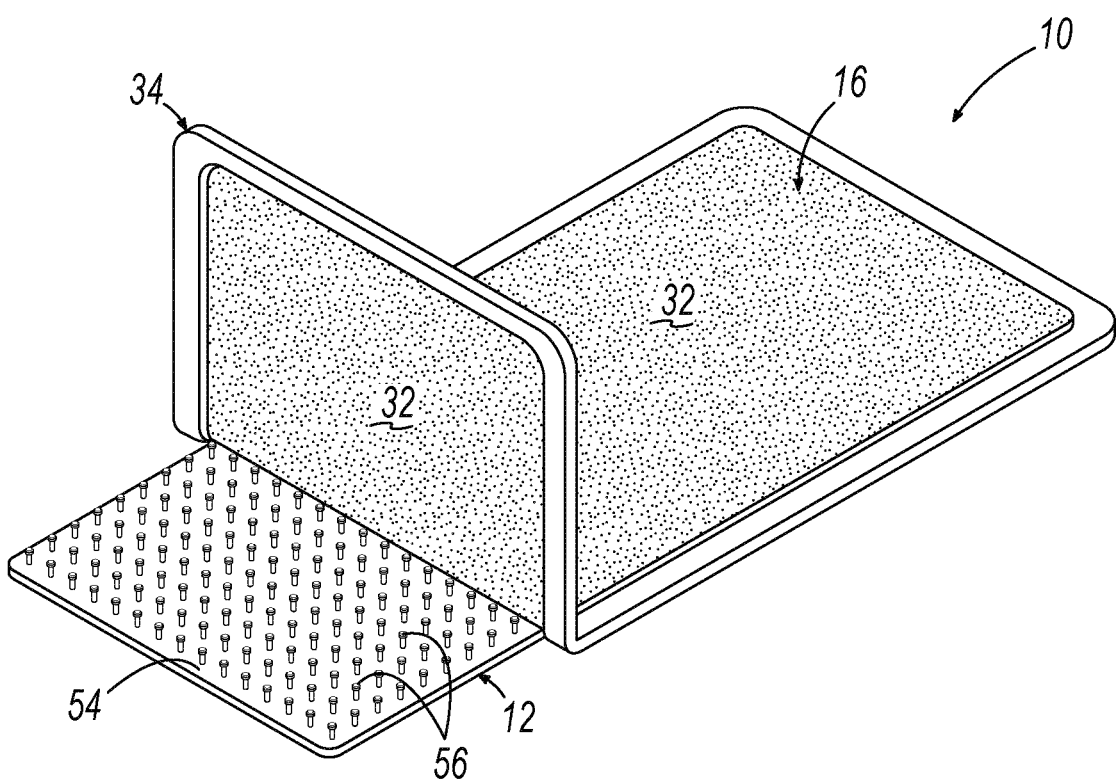
FIG. 18 is a perspective view of a further embodiment of this invention with the top layer partially peeled away from the base layer.
Figure 19:
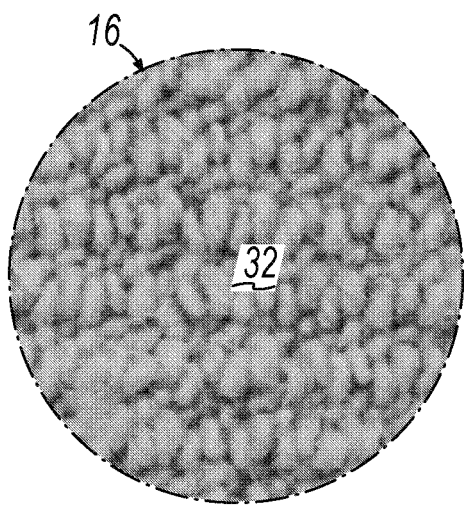
FIGS. 19 and 20 are enlarged views of the top layer and base layer, respectively, of the embodiment of FIG. 18.
Figure 20:
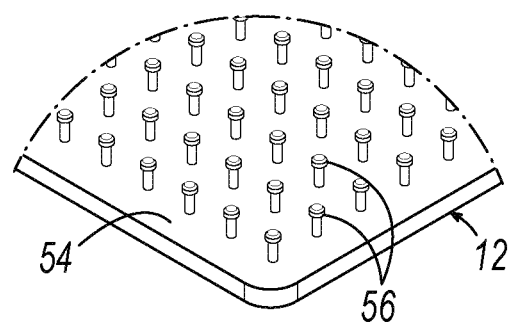

Another embodiment of the mat 10 according to this invention is shown in FIG. 18 in which the base layer 12 includes a series of evenly spaced upwardly projecting-headed pins 56. The size, shape and density of the pins 56 can be optimized for different types of top layer 16 structures. The top layer 16 of the embodiment in FIG. 18 includes the generally perimeter frame 34 between which is stretched the fabric body component 32. The pins 56 interlock with the woven fabric body 32 providing a reliable interface 18 between the top layer 16 and base layer 12. Enlarged views of the fabric top layer 16 and the pins 56 of the bottom layer 12 are shown in FIGS. 19 and 20, respectively.

Figure 21:
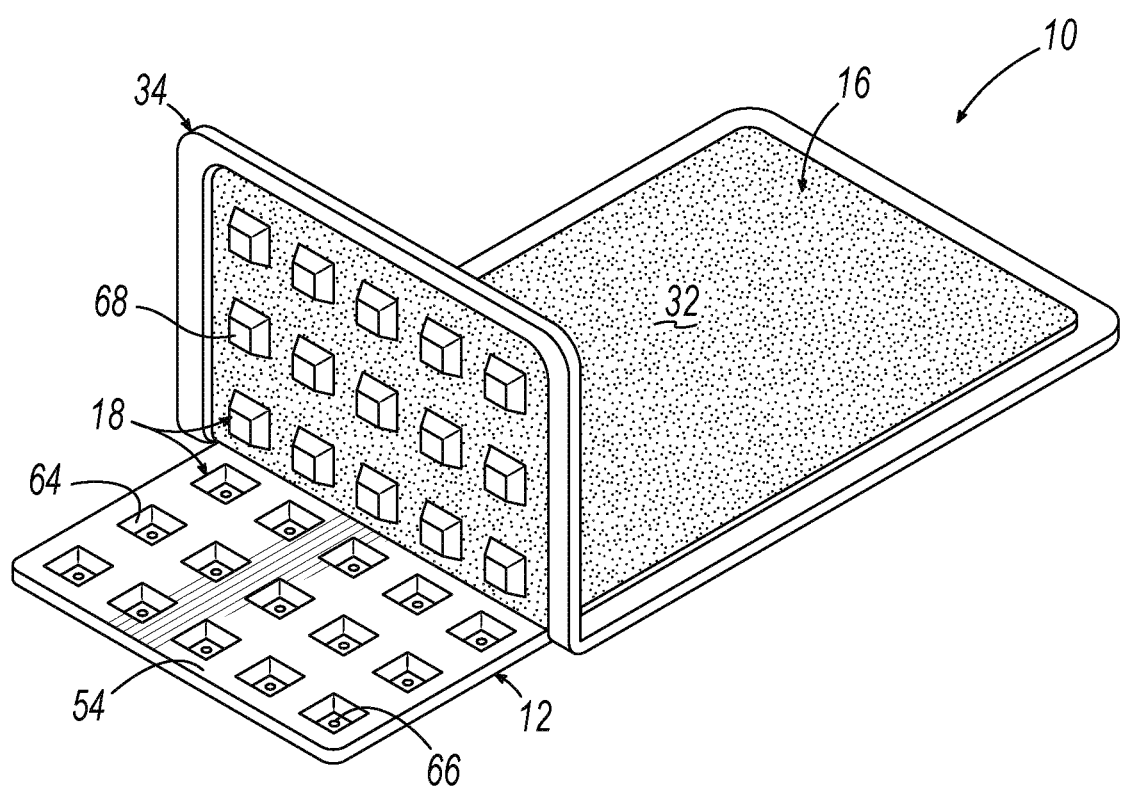
FIG. 21 is a perspective view of a further embodiment of a deconstructed mat according to this invention with the top layer partially peeled away from the base layer.

Referring to FIG. 21, a still further embodiment of the deconstructed mat 10 according to this invention is shown in which the base layer 12 includes a series of upwardly open tapered pockets 64, each of which is generally rectangular or square in the embodiment shown in FIG. 21. Seated within the base of each pocket 64 is a magnet 66 incorporated into the base layer 12 of the mat 10 after the vulcanization process to avoid temperature damage to the magnets 66. The quantity, density and pull strength of each magnet 66 is tailored for each particular mat size and structure.

As shown in FIG. 21, the undersurface of the top layer 16 includes a number of at least partially metal bosses 68 which may be seated within rubber or other mounting structure. Each boss 68 is generally square, tapered, sized and configured to seat within an associated pocket 64 in the base layer 12 to thereby adhere the top layer 16 to the base layer 12. The boss 68 and pocket 64 interface 18 allows for quick and hassle-free installation with a magnet's automatic alignment and the necessary holding force to secure the top layer 16 to the base layer 12.

Figure 22:
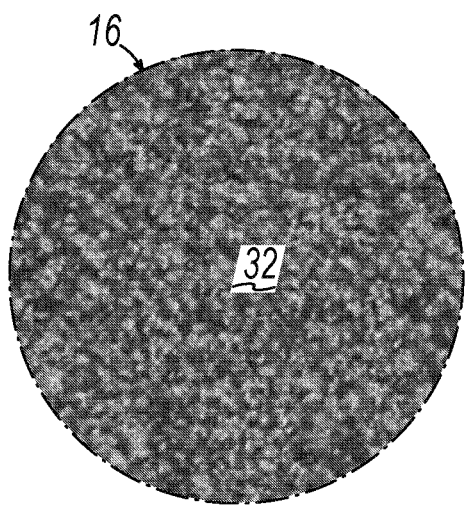
FIGS. 22 and 23 are enlarged views of the top layer and base layer, respectively, of the embodiment of FIG. 21.
Figure 23:
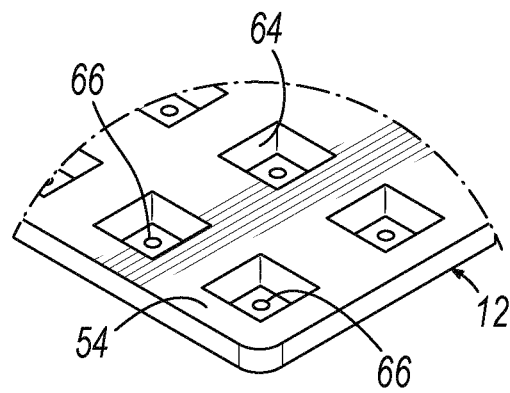

In FIGS. 22 and 23, enlarged views of the top layer 16 and a portion of the bottom layer 12 with the magnets 66 exposed in the pockets 64 are shown, respectively.

Figure 24:
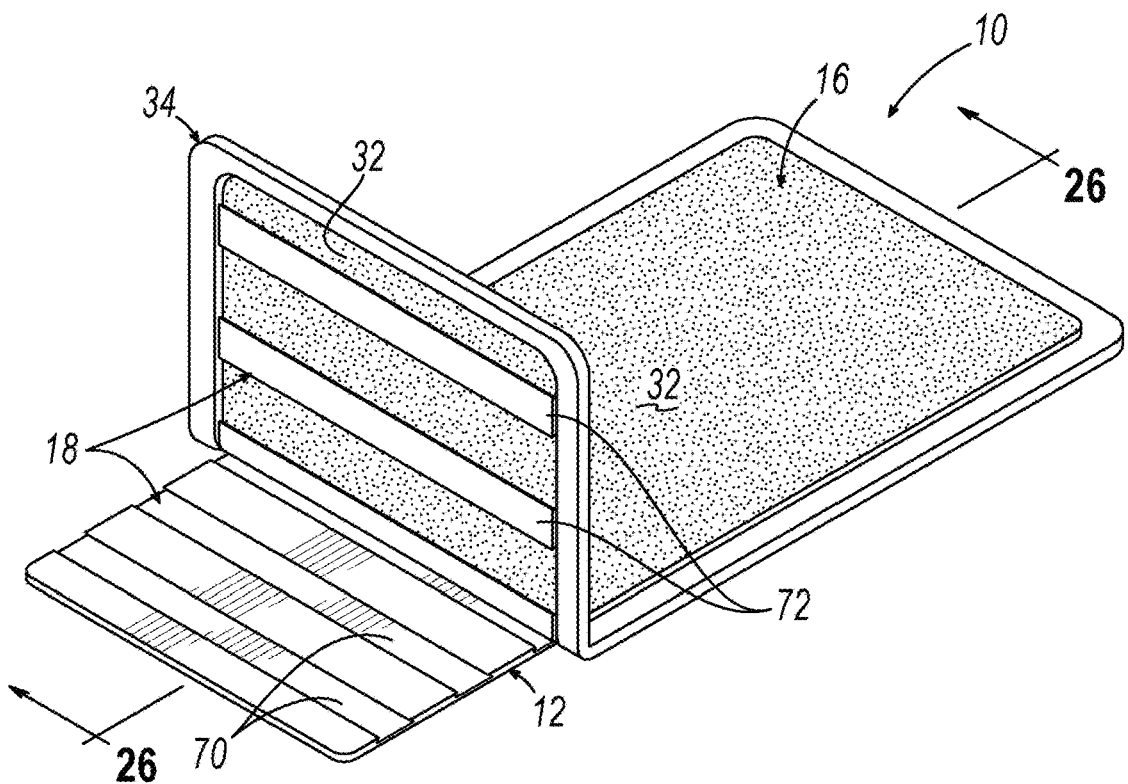
FIGS. 24 and 25 are further embodiments of a deconstructed mat according to this invention with the top layer partially peeled away from the base layer.
Figure 25:
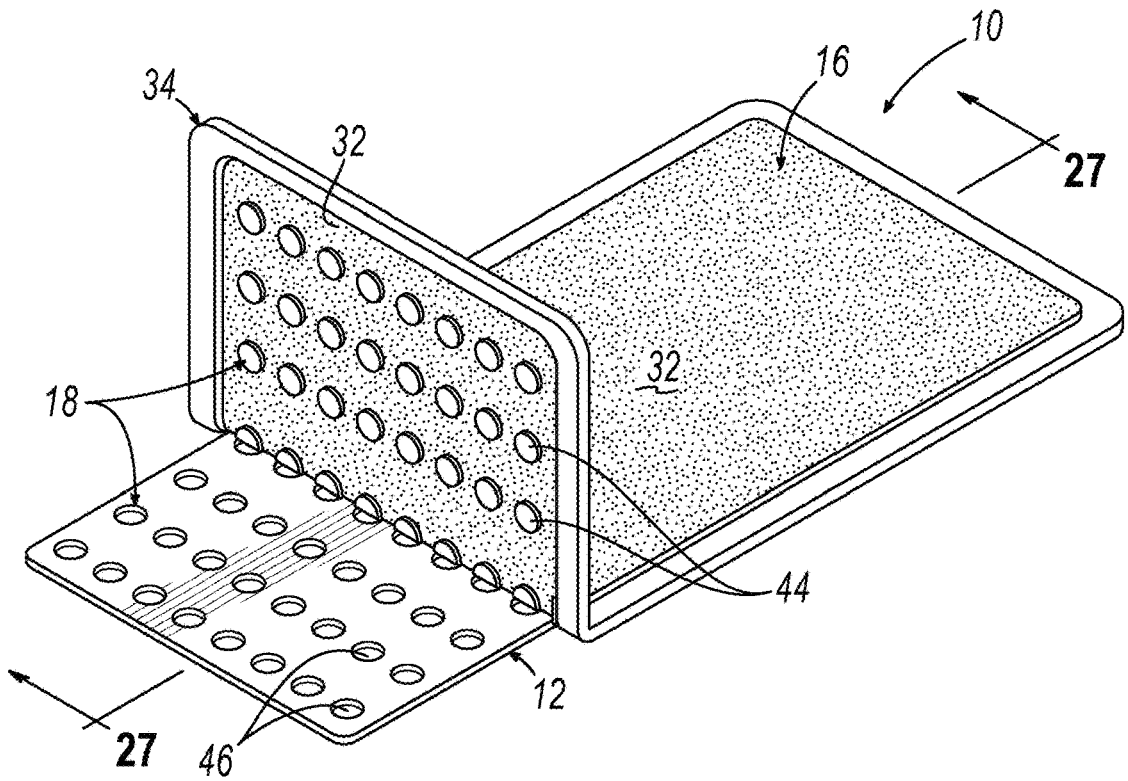
Figure 26:
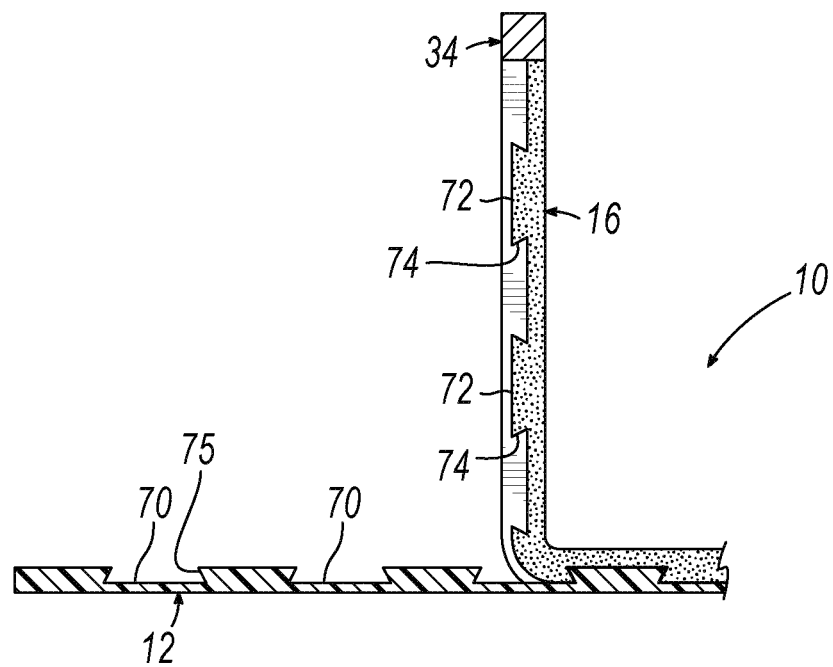
FIGS. 26 and 27 are cross-sectional views taken along lines 26-26 and 27-27 of FIGS. 24 and 25, respectively, showing the coupling features of the embodiments of FIGS. 24 and 25, respectively.

Further alternative embodiments are shown of the deconstructed mat 10 according to this invention in FIGS. 24 and 25. In FIG. 24, the base layer 12 includes a series of generally parallel channels 70 extending across the width of the mat 10. The channels 70 are sized to receive therein ribs 72 extending laterally across the back face of the top layer 16 as shown in FIG. 24. A cross-sectional view of the interlocking ribs 72 and channels 70 of the embodiment in FIG. 24 is shown in FIG. 26. The ribs 72 and channels 70 may have an undercut 74 and overhang 75, respectively, to increase the security of the interface 18 between the top layer 16 and the base layer 12 as shown in FIG. 26.

Figure 27:
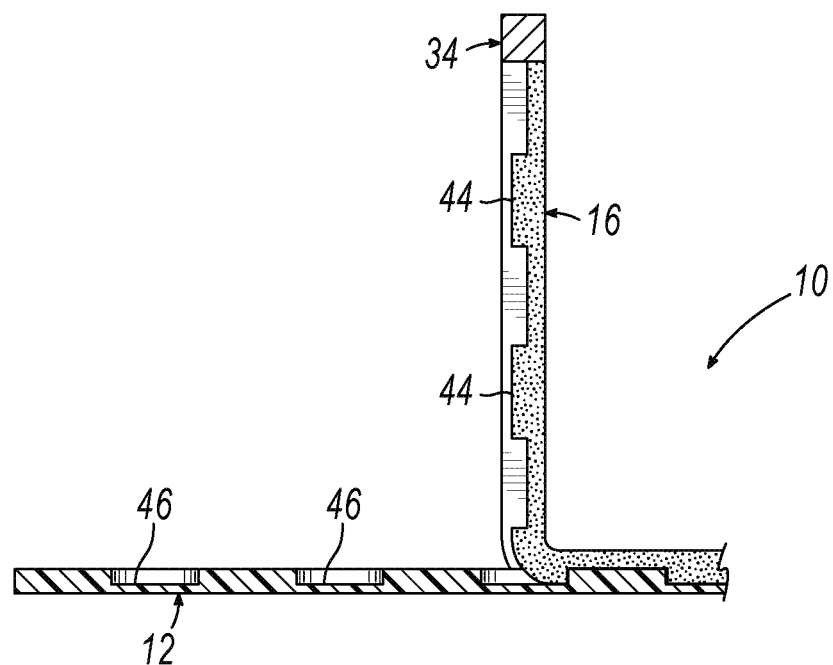

In FIG. 25 a series of interlocking sockets 46 and studs 44 are provided as the interface 18 between the top layer 16 and the base layer 12. The studs 44 in the embodiment shown in FIG. 25 are generally circular and project from the back face of the top layer 16. Each stud 44 is received within a socket 46 in the base layer 12. As shown in FIG. 27, an interaction between the studs 44 and the sockets 46 to secure the top layer 16 to the base layer 12 is shown in cross section.

Figure 28:
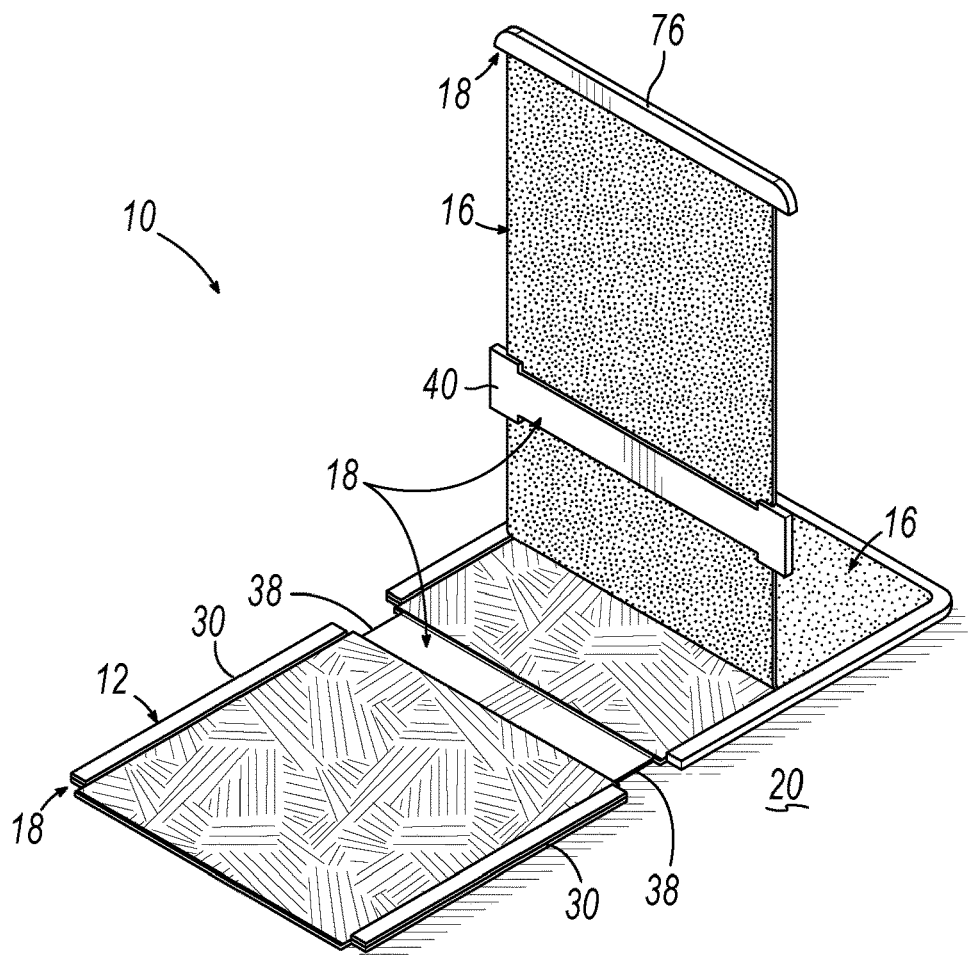
FIG. 28 is a further embodiment of a deconstructed mat according to this invention with the top layer partially peeled from the base layer.

A still further embodiment of the mat 10 according to this invention is shown in FIG. 28 in which the base layer 12 includes a pair of notches 38 in the longitudinal side edges 30 thereof. The fabric body 32 of the top layer 16 includes an endcap 76 which mates with a recessed portion of the end of the base layer 12. The interface 18 on both the top fabric layer 16 and bottom base layer 12 gives the installer 42 a visible indication of an intuitive assembly experience. The end cap 76 includes corners that provide a hard stop for assembly while the longitudinal side edges keep the top fabric body 32 in place with the notches 38 and complimentary feature extending from the back face of the top layer. The engagement of the interface 18 is visible from the top which provides confidence and intuitiveness during assembly.

Figure 29:
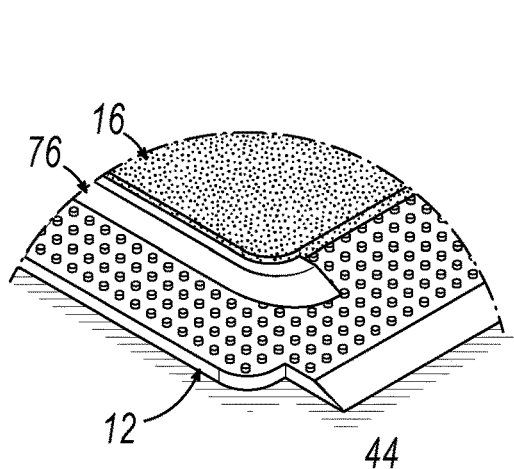
FIGS. 29 and 30 are enlarged views of portions of the mat of FIG. 28.
Figure 30:
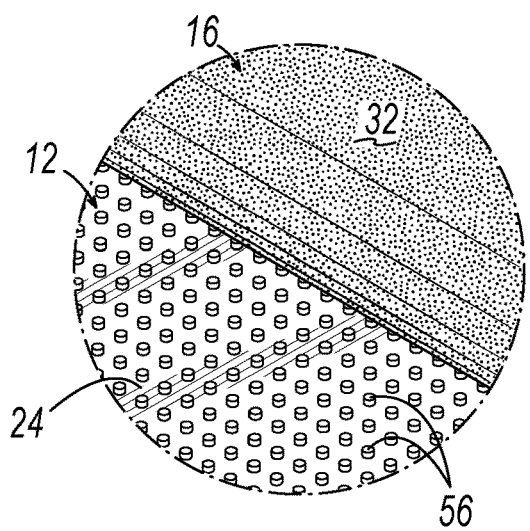

In FIGS. 29 and 30 detailed portions of the mat embodiment shown in FIG. 28 are provided. In FIG. 29, the end cap 76 and corner sections which mate with the complimentary portion of the base layer 12 are shown. The base layer 12 may include grippers 56 projecting from the upper surface 24 thereof to engage the fabric body 32 of the top layer 16 as shown in FIG. 30.

Figure 31:
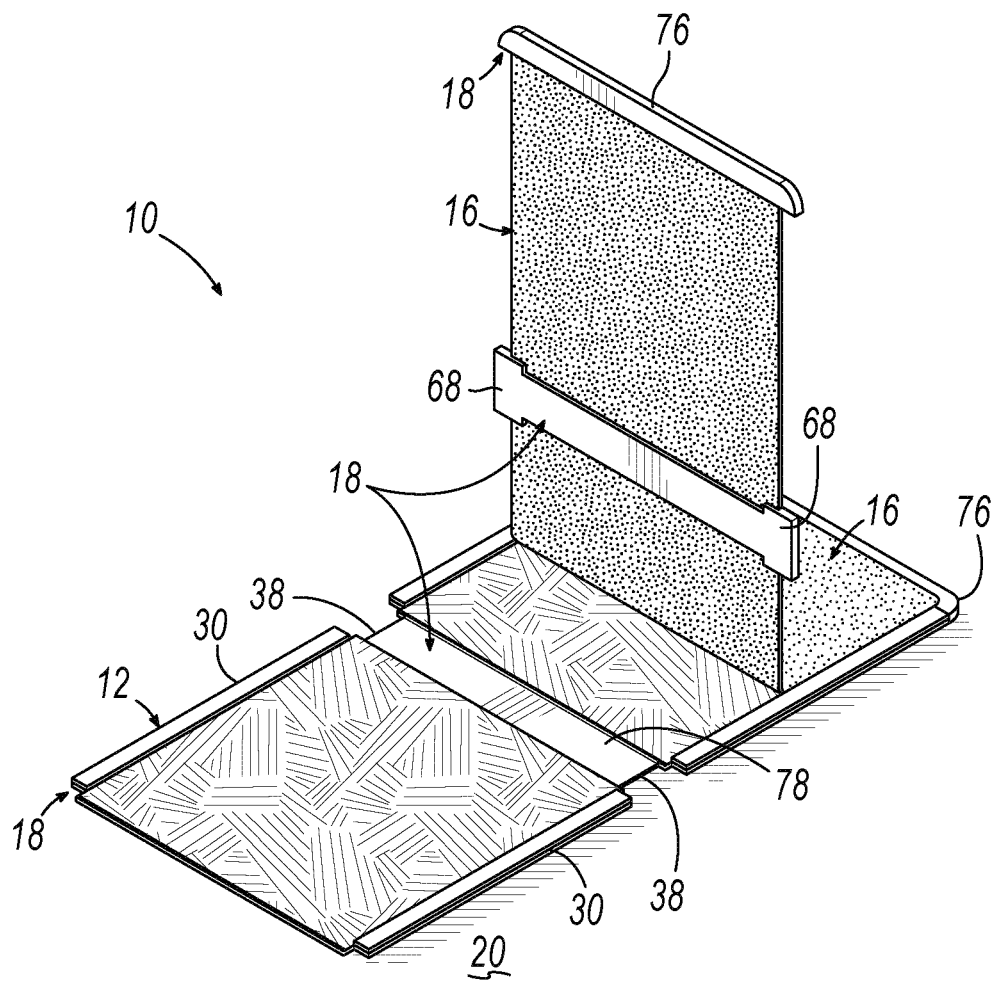
FIG. 31 is a perspective view of a further embodiment of a deconstructed mat according to this invention with the top layer partially peeled away from the base layer.

The embodiment of the mat 10 shown in FIG. 28 is likewise shown in FIG. 31 in which the interlocking longitudinal ends of the top layer 16 are positioned to mate with the base layer 12. The base layer 12 also includes a pair of medial notches 38 connected by a channel 78. The top layer 16 includes the bosses 68 along each side edge which are joined together by a rib which seats within the channel to 78 provide further physical indication of the assembly and positive engagement of the layers. Moreover, the multiple attachment locations between the top layer 16 and base layer 12 minimizes potential fabric distortion of the fabric body 32 as a result of laundering.

Figure 32:
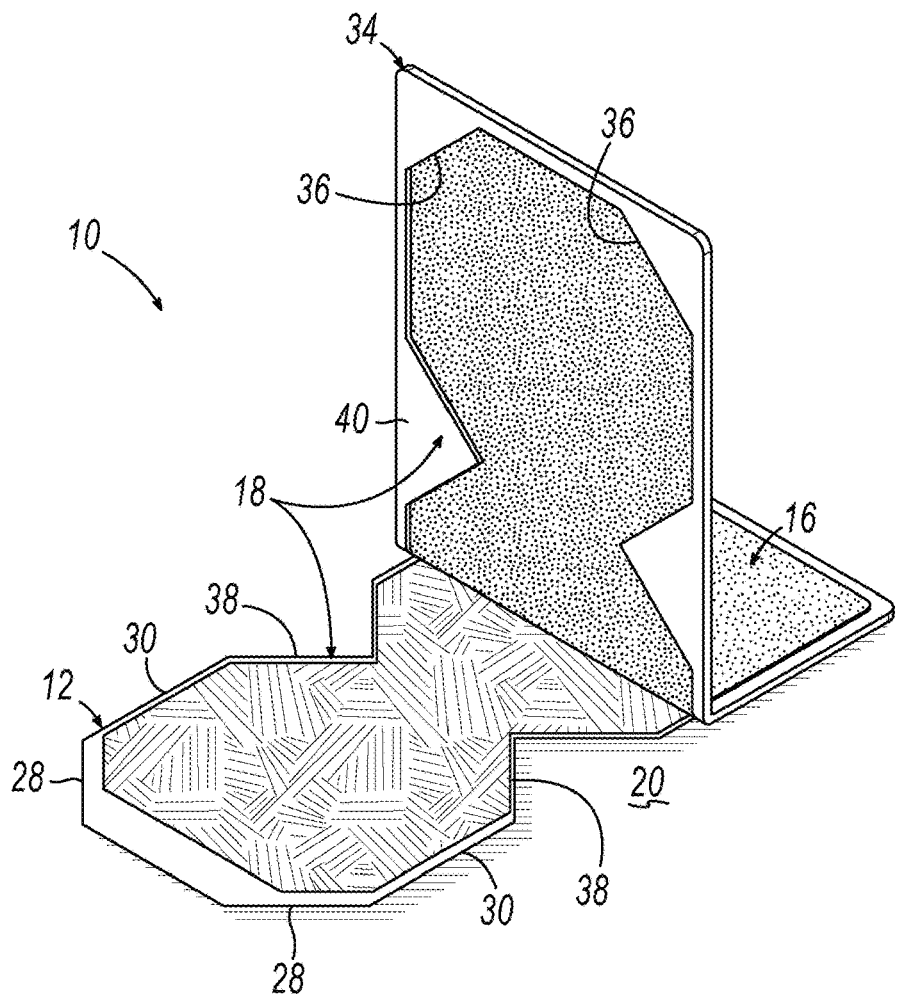
FIG. 32 is a perspective of a further embodiment of a deconstructed mat with the top layer partially peeled from the base layer.

Referring to FIG. 32, a further embodiment of the deconstructed mat 10 according to this invention is shown in which the fabric top layer 16 includes a perimeter frame 34 and enlarged corners 36 to mate with chamfered edges 28 of the base layer 12. The base layer 12 also includes medial enlarged notches 38 which receive therein enlarged portions 40 of the frame 34 on the fabric top layer 16. Angled edges function as lead-ins to allow quick alignment of the top layer 16 over the base layer 12. Larger features of the embodiment of the mat 10 in FIG. 32 provide more control during assembly of the layers. Moreover, the top surface of the mat 10 offers a seamless layer 16 with better mat 10 appearance during the alignment and installation process.

Figure 33:
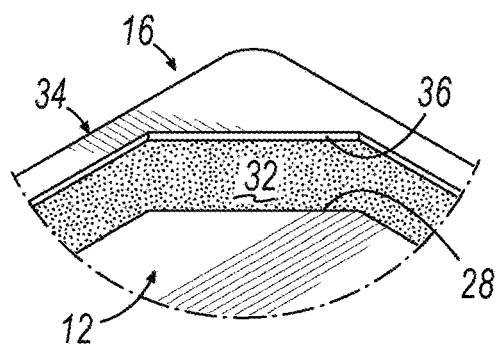
FIGS. 33 and 34 are enlarged views of components of the embodiment shown in FIG. 32.
Figure 34:
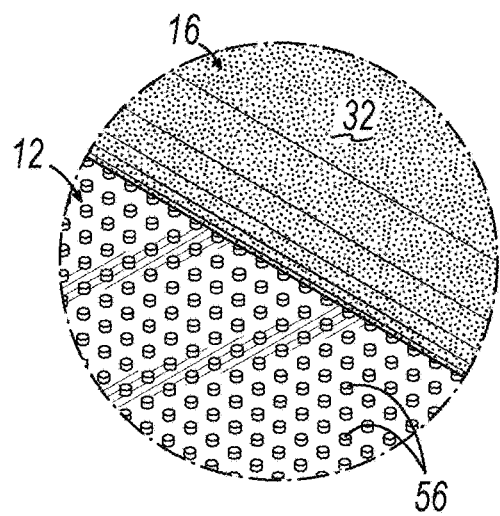

FIGS. 33 and 34 are enlarged views of the mating corner sections 36 of the base layer 12 and top layer 16 (FIG. 33) and grippers 56 which may project from the base layer 12 to engage the fabric body 32 of the top layer 16 (FIG. 34).

Figure 35:
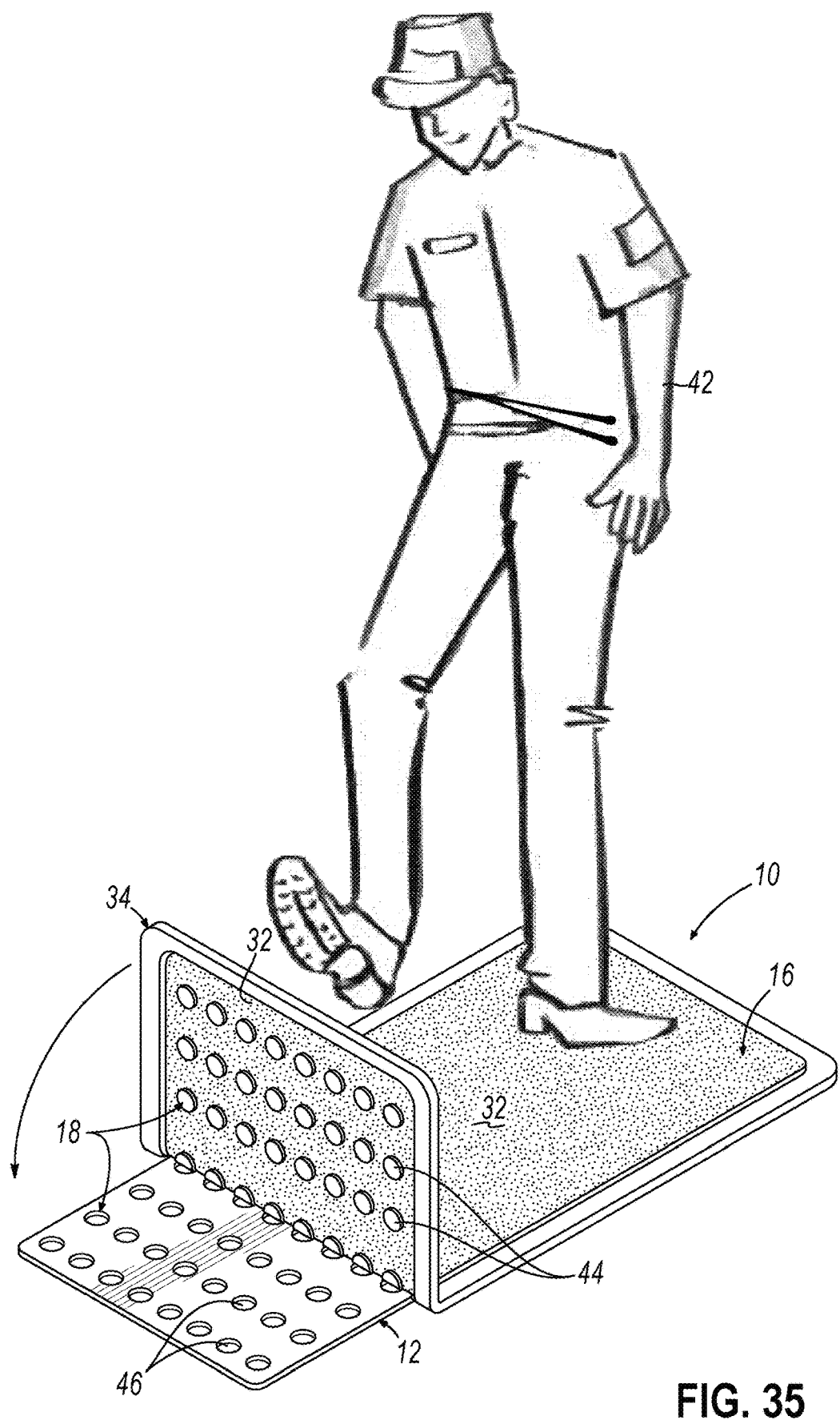
FIG. 35 is a perspective view showing one embodiment of a deconstructed mat according to this invention being assembled on site.

Referring to FIG. 35, a perspective view showing one method for installing and assembling the fabric top layer 16 of the embodiment of FIG. 25 onto the base layer 12 is shown. An installer 42 would begin by aligning one longitudinal end of the fabric top layer 16 with the longitudinal end of the base layer 12 and then rolling the fabric top layer 16 longitudinally towards the opposite end of the base layer 12 and while so doing inserting the studs 44 into the sockets 46 and thereby mating the top layer 16 with the bottom layer 12 to form the floor mat 10 on site 14 at the desired installation location.

Figure 36:
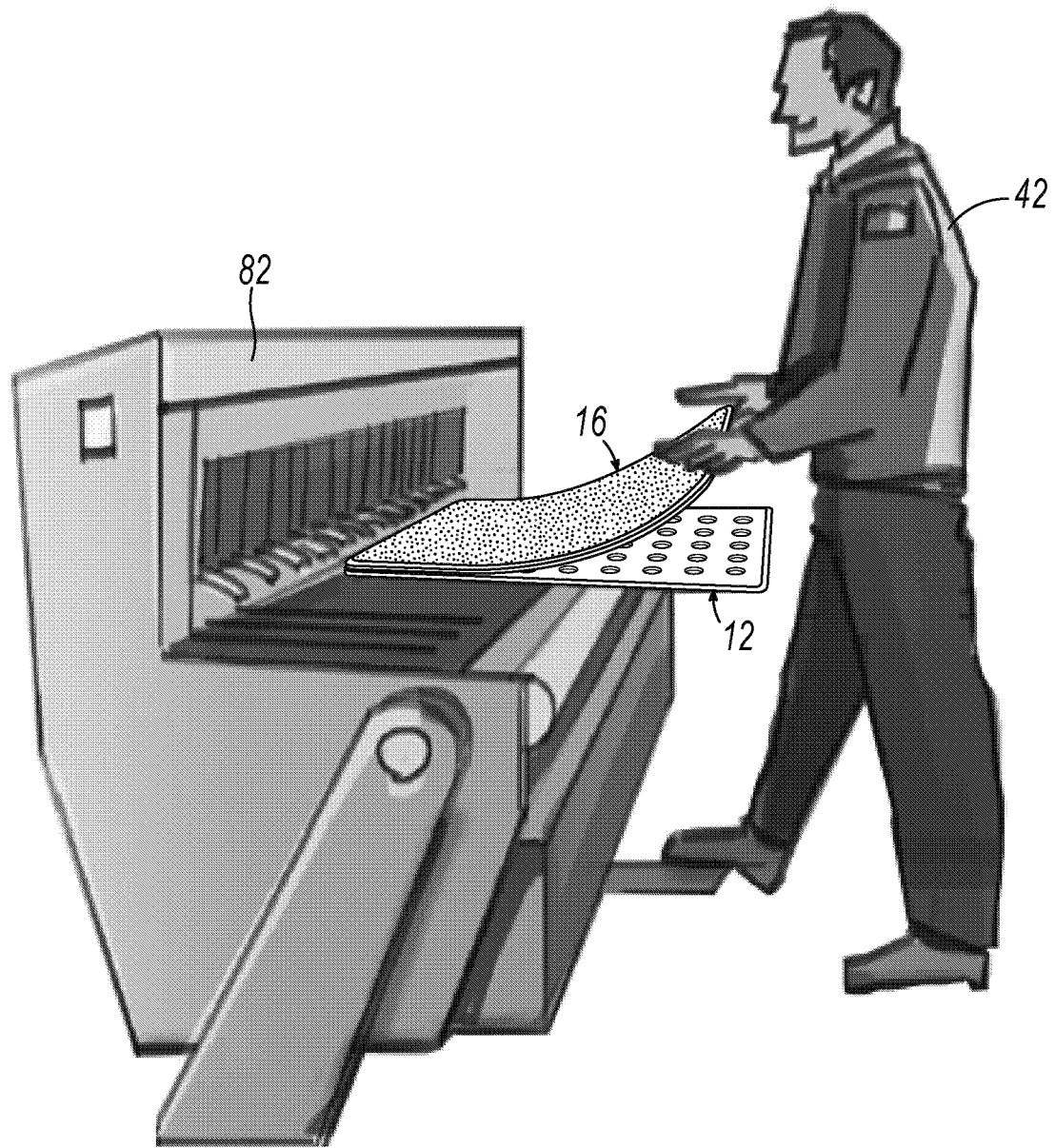
FIG. 36 is a schematic view of a deconstructed mat according to one embodiment of this invention being assembled by a roller.

Referring to FIG. 36, a further alternative for assembly is by a roller 82 and inserting the aligned top layer 16 and base layer 12 through the roller machine to thereby mate the top layer 16 and base layer 12 after the fabric top layer 12 has been processed and cleaned.

Figure 37:
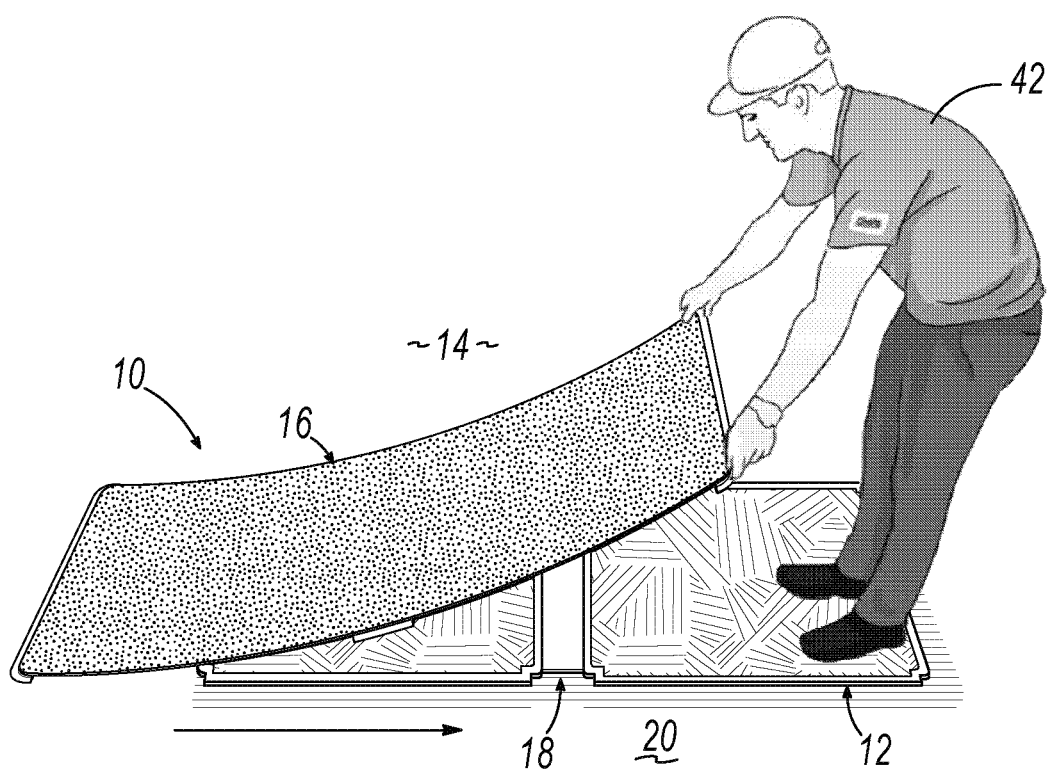
FIG. 37 is a perspective schematic view of a deconstructed mat according to one embodiment of this invention being assembled for use.
Figure 38:
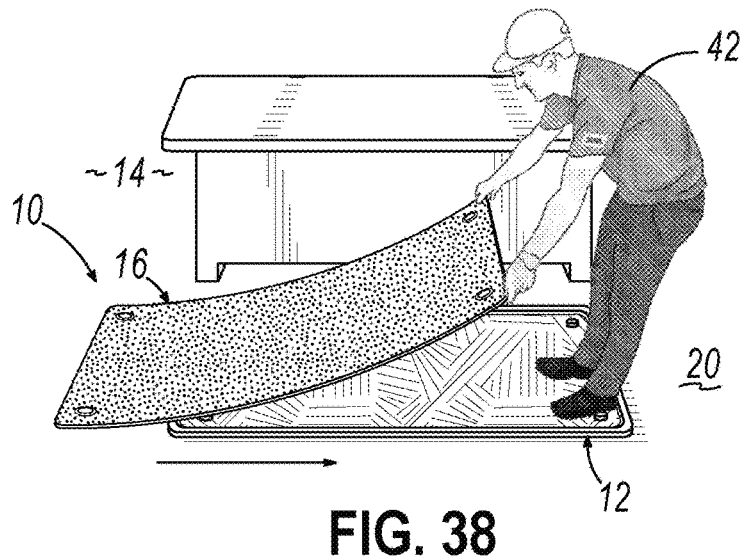
FIGS. 38-40 are sequential views of a deconstructed mat according to the embodiment of this invention being assembled on site.
Figure 39:
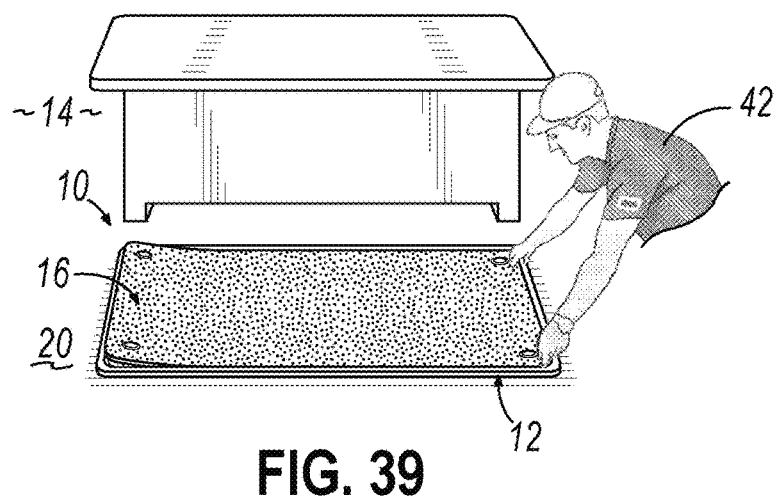

FIG. 37 shows a further alternative embodiment for assembly of the top layer 16 with the base layer 12 in which the installer 42 would throw one end of the top layer 16 beyond the mating edge of the base layer 12 and then pull the unfurled fabric top layer 16 longitudinally towards the opposite end of the base layer 12 thereby engaging the distal ends of the fabric and base layer together and ultimately mating the proximal ends to form the deconstructed floor mat 10.

Figure 40:
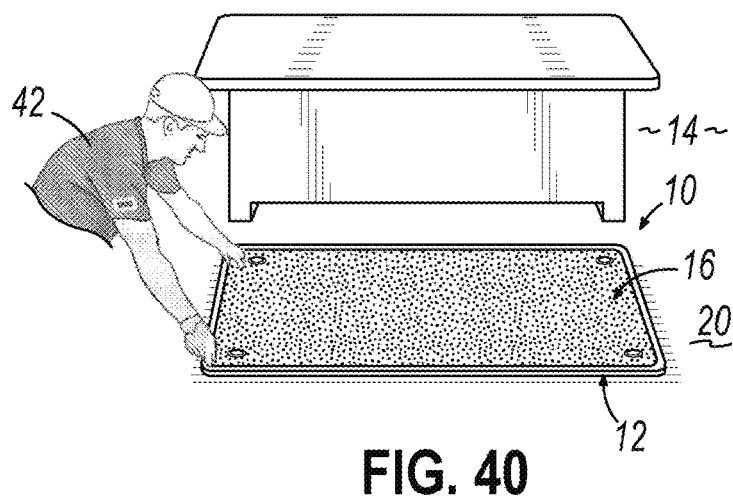

FIGS. 37-40 show sequential views of an installer 42 assembling the fabric top layer 16 with the base layer 12 according to one embodiment of this invention similar to that which was previously described with respect to FIG. 37. One installation sequence is for the installer to throw the top layer 16 (FIG. 37), then pull and center the top layer 16 on the base layer 12 (FIG. 38), then align the top layer 16 and press it onto the base layer 12 (FIG. 39) and finally press the top layer 16 down onto the base layer 12 and finish the assembly (FIG. 40).

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A floor mat to be positioned on a floor surface, the floor mat comprising:
   a base layer having a lower surface positioned on the floor surface;
   a base layer coupling feature;
   a top layer which is capable of being coupled to the base layer, removed from the base layer and then replaced with another top layer to thereby construct the floor mat; and
   the top layer having a fabric component and a top layer coupling feature which is compatible to mate with the base layer coupling feature to couple the top layer to the base layer to construct the floor mat;
   wherein the top layer coupling feature and the base layer coupling feature are selected from one of a plurality of coupling features comprising:
      (a) the top layer coupling feature being a generally rectangular perimeter frame defining an area spanned by the fabric component with the frame having at least one non-orthogonal corner feature and the base layer being non-rectangular and the base layer coupling feature being at least one non-orthogonal mating feature;
      (b) the top layer coupling feature being a plurality of top layer spaced frame members each extending across a width of the top layer and the base layer coupling feature being a plurality of notches in the base layer sized, shaped and positioned to mate with corresponding ones of the top layer spaced frame members;
      (c) the top layer coupling feature being a generally rectangular perimeter frame and a grid within the frame having a plurality of apertures and the base layer coupling feature including a size and shape of the base layer seating within the frame; and
      (d) the top layer coupling feature being a generally rectangular frame and the base layer coupling feature being a plurality of upstanding pins each of which engage the fabric component of the top layer extending within the frame.

2. The floor mat of claim 1 wherein the base layer is impervious to the flow of water passing through the selected top layer.

3. The floor mat of claim 1 wherein the base layer further comprises:
   a cavity bounded by a peripheral lip extending around a perimeter of the base layer.

4. The floor mat of claim 1 wherein each of the plurality of top layers is machine washable when separate from the base layer.

5. The floor mat of claim 1 wherein the at least one of a plurality of coupling feature combinations comprises combination (a), wherein the at least one non-orthogonal mating feature of the base layer coupling feature is a pair of chamfered corners and the at least one non-orthogonal corner feature of the top layer coupling feature is a pair of angled corners which mates with the pair of chamfered corners.

6. The floor mat of claim 1 wherein the at least one of a plurality of coupling feature combinations comprises combination (b), wherein the base layer further comprises:
   a plurality of base layer spaced frame members which cooperate with the plurality of top layer spaced frame members to form a perimeter frame around the floor mat when each of the plurality of top layers is coupled to the base layer.

7. The floor mat of claim 1 wherein the at least one of a plurality of coupling feature combinations comprises combination (c), the floor mat further comprising:
   a plurality of downwardly projecting fingers on the top layer cooperating with a plurality of upwardly projecting fingers on the base layer to provide support for the fabric component.

8. A floor mat to be positioned on a floor surface, the floor mat comprising:
   a base layer having a lower surface positioned on the floor surface;
   a base layer coupling feature;
   a top layer that is capable of being removed and replaced with another top layer to thereby construct the floor mat, wherein the top layer further comprises a fabric component; and
   the top layer has a top layer coupling feature which is compatible to mate with the base layer coupling feature to couple the top layer to the base layer to construct the floor mat;
   wherein the top layer further comprises a frame generally surrounding the fabric component and being larger than the base layer to cover the base layer when the selected top layer is coupled to the base layer;
   wherein the base layer coupling feature further comprises a base non-planar surface on the base layer to engage and retain the fabric component of the top layer and inhibit relative movement between the top layer and the base layer;
   wherein the top layer further comprises a grid which defines spaced apertures providing permeability to the top layer and the grid providing structural stability to the top layer.

9. A floor mat to be positioned on a floor surface, the floor mat comprising:
   a base layer having a lower surface positioned on the floor surface;
   a base layer coupling feature;
   a top layer that is capable of being removed and replaced with another top layer to thereby construct the floor mat;
   wherein the base layer is impervious to the flow of water passing through the selected top layer;
   wherein the top layer further comprises a fabric component;

wherein the plurality of top layer is machine washable when separate from the base layer; and the top layer having a top layer coupling feature which is compatible to mate with the base layer coupling feature to couple the top layer to the base layer to construct the floor mat;

wherein the top layer coupling feature and the base layer coupling feature are selected from one of a plurality of coupling features comprising:

(a) the top layer coupling feature being a generally rectangular perimeter frame defining an area spanned by the fabric component with the frame having at least one non-orthogonal corner feature and the base layer being non-rectangular and the base layer coupling feature being at least one non-orthogonal mating feature;

(b) the top layer coupling feature being a plurality of top layer spaced frame members each extending across a width of the top layer and the base layer coupling feature being a plurality of notches in the base layer sized, shaped and positioned to mate with corresponding ones of the top layer spaced frame members;

(c) the top layer coupling feature being a generally rectangular perimeter frame and a grid within the frame having a plurality of apertures and the base layer coupling feature including a size and shape of the base layer seating within the frame; and (d) the top layer coupling feature being a generally rectangular frame and the base layer coupling feature being a plurality of upstanding pins each of which engage the fabric component of the top layer extending within the frame.

10. The floor mat of claim 9 wherein the at least one of a plurality of coupling feature combinations comprises combination (a), wherein the at least one non-orthogonal mating feature of the base layer coupling feature is a pair of chamfered corners and the at least one non-orthogonal corner feature of the top layer coupling feature is a pair of angled corners which mates with the pair of chamfered corners.

11. The floor mat of claim 9 wherein the at least one of a plurality of coupling feature combinations comprises combination (b), wherein the base layer further comprises:

a plurality of base layer spaced frame members which cooperate with the plurality of top layer spaced frame members to form a perimeter frame around the floor mat when each of the plurality of top layers is coupled to the base layer.

12. The floor mat of claim 9 wherein the at least one of a plurality of coupling feature combinations comprises combination (c), the floor mat further comprising:

a plurality of downwardly projecting fingers on the top layer cooperating with a plurality of upwardly projecting fingers on the base layer to provide support for the fabric component.

13. A floor mat to be positioned on a floor surface, the floor mat comprising:

a base layer having a lower surface positioned on the floor surface;

a base layer coupling feature;

a top layer that is capable of being removed and replaced with another top layer to thereby construct the floor mat;

wherein the base layer is impervious to the flow of water passing through the top layer;

wherein the top layer further comprises a fabric component and is machine washable when separate from the base layer; and the top layer has a top layer coupling feature which is compatible to mate with the base layer coupling feature to couple the top layer to the base layer to construct the floor mat;

wherein the base layer coupling feature further comprises a base non-planar surface on the base layer to engage and retain the fabric component of the top layer and inhibit relative movement between the top layer and the base layer;

wherein the top layer coupling feature further comprises a top non-planar surface juxtaposed and engaged with the base non-planar surface;

wherein the top layer further comprises a grid which defines spaced apertures providing permeability to the top layer and the grid providing structural stability to the top layer.

* * * * *